United States Patent [19]

Tojima

[11] Patent Number: 4,944,499
[45] Date of Patent: Jul. 31, 1990

[54] DAMPER DISK

[75] Inventor: Hiromi Tojima, Neyagawa, Japan

[73] Assignee: Kabushiki Kaisha Daikin Seisakusho, Osaka, Japan

[21] Appl. No.: 304,632

[22] Filed: Feb. 1, 1989

[30] Foreign Application Priority Data

Feb. 10, 1988 [JP] Japan .............................. 63-16712[U]

[51] Int. Cl.$^5$ .......................... F16F 1/14; F16D 47/02; F16D 3/66
[52] U.S. Cl. ................................. 267/154; 192/106.2; 464/68
[58] Field of Search ................ 192/70.17, 70.16, 89 B, 192/106.2, 70.28; 464/68, 64, 66; 267/154, 155, 157

[56] References Cited

U.S. PATENT DOCUMENTS

| | | | |
|---|---|---|---|
| 4,493,673 | 1/1985 | Anders et al. | 192/106.2 X |
| 4,493,674 | 1/1985 | Tamura et al. | 192/106.2 X |
| 4,577,742 | 3/1986 | Saida | 192/106.2 |
| 4,655,337 | 4/1987 | Carmillet et al. | 192/106.2 |
| 4,775,042 | 10/1988 | Komno et al. | 192/106.2 |

FOREIGN PATENT DOCUMENTS 0184229 8/1987 Japan .

Primary Examiner—Robert J. Oberleitner
Attorney, Agent, or Firm—Armstrong, Nikaido, Marmelstein, Kubovcik & Murray

[57] ABSTRACT

A damper disk having an output hub; an annular intermediate member disposed around the output hub; an annular spring seat member disposed around the intermediate member, and including spring seats which project radially inwardly; a pair of annular input plates disposed at opposite sides of the intermediate member; a plurality of circumferentially spaced pairs of input springs which circumferentially connect the input plates and the intermediate member to each other, the input springs in each pair being arranged circumferentially in series with the spring seat therebetween; output springs which circumferentially connect the intermediate member and the output hub to each other, the output springs being formed by compressible coil springs; and stop means for restricting relative rotation between the components in the disk.

6 Claims, 1 Drawing Sheet

DAMPER DISK

BACKGROUND OF THE INVENTION (1) Field of the Invention

The present invention relates to a damper disk used as a clutch disk in a friction clutch, and particularly to a damper disk of a so-called "flange division" type in which a flange-like portion provided around an output hub of the damper disk is divided into a plurality of annular portions, so that a maximum torsion angle of twisting angle between an input part and the output hub may be increased for improving absorbing effect for torque vibration.

(2) Description of the Prior Art

A damper disk similar to that described above is disclosed in the Japanese first laid-open publication No. 62-184229. The damper disk disclosed there has an output part which is divided into inner and outer hubs, and a flange integrally formed around the outer hub is connected to an input plate through a plurality of spring pairs, each of which includes springs in series with spacers therebetween.

However, since the prior structure described above is not provided with a stopper for restricting relative rotation or twisting between the input plate and the flange, the springs are fully compressed, which may cause breakage of the springs.

Further, since the prior structure described above includes an arc-shaped (i.e., C-shaped) spring as a connecting spring for connecting the outer hub to the inner hub, the connecting spring can not deflect to a large extent, and thus it may be impossible to determine a sufficiently large maximum torsion angle between the inner and outer hubs.

Accordingly, it is an object of the present invention to provide a damper disk, overcoming the above-noted problems.

SUMMARY OF THE INVENTION

According to the invention, a damper disk comprises an output hub; an annular intermediate member disposed around said output hub; an annular spring seat member disposed around said intermediate member, and including spring seats which project radially inwardly: a pair of annular input plates disposed at opposite sides of said intermediate member and around said output hub; a plurality of circumferentially spaced pairs of input springs which circumferentially connect said input plates and said intermediate member to each other, said input springs in each pair being arranged circumferentially in series with said spring seat therebetween; a plurality of circumferentially spaced output springs which circumferentially connect said intermediate member and said output hub to each other said output springs being formed bY compressible coil springs extending substantially in the circumferential direction of said damper disk; and stop means for restricting relative rotation between said input plates and said spring seat member, between said spring seat member and said intermediate member and between said intermediate member and said output hub.

In an embodiment, a sub-plate for holding said output springs is fixed to said intermediate member, and a flange connected to said sub-plate through said output springs is provided in said output hub, so that said intermediate member and said output hub may be connected together through said sub-plate, said output springs and said flange provided in said output hub.

According to the above structure, the torque in the input plates is transmitted to the intermediate member through the input springs at one side of said input spring pair, the spring seats and the input springs at the other side of the input spring pairs, and then is transmitted from the intermediate member to the output hub through the output springs. The springs are compressed by the force corresponding to the transmitted torque, and the components from the input plates to the output hub are twisted relative to each other through angles corresponding to the compressed length of the springs.

In the above operation, since the output springs are compressible coil springs, the maximum torsion angle can be set large, as compared with the C-shaped spring disclosed in said Japanese publication No. 62-184229.

Further, since the maximum torsion angles between the input plates and the spring seat member and between the spring seat member and the intermediate member are restricted by the stop means, the input springs are prevented from being fullY compressed, and thus from receiving a remarkably large force which may cause breakage thereof.

BRIEF DESCRIPTION OF THE DRAWINGS

Embodiments of the invention will now be described by way of example only, with reference to the accompanying drawings, in which.

DETAILED DESCRIPTION OF THE PREFERRED EMBODIMENTS

Figure 1:
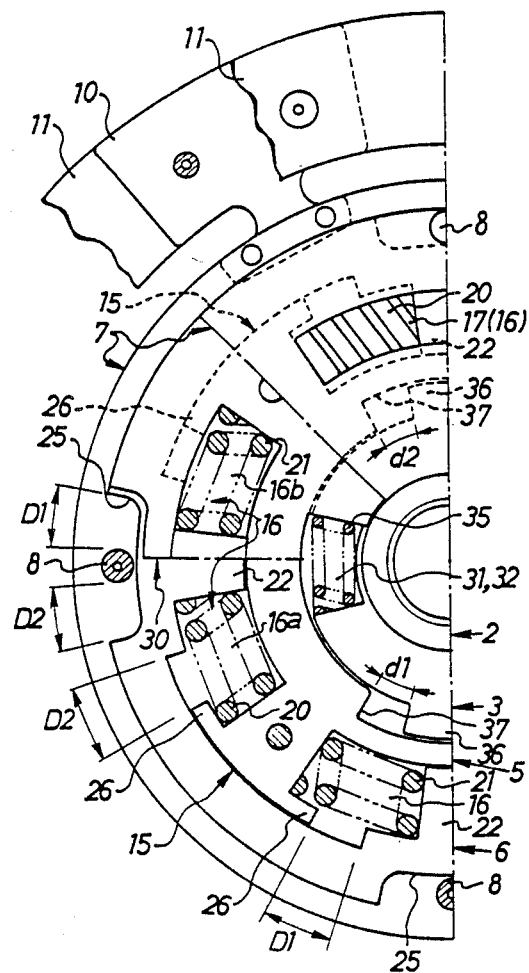
FIG. 1 is a fragmentary plan view of a damper disk of an embodiment of the invention with a certain part cutaway.

Referring to the Figures, an output shaft 1, only a center line of which is illustrated in FIG. 1, is connected to an output hub 2 having a flange 3 of a small diameter. Around the flange 3 is rotatably fitted an annular intermediate member 5 having a same thickness as the flange 3. An annular spring seat member 6 having a same thickness as the member 5 is rotatablY fitted around the intermediate member 5.

A pair of input plates 7 are disposed at axially opposite sides of the flange 3, the intermediate member 5 and the spring seat member 6, and is rotatablY fitted around the output hub 2. Both of the input plates 7 are of annular shape, and are rigidly connected at radially outer portions to each other by axially extending stop pins 8. Cushioning plates 10 (only one of which is illustrated) are fixed to the radiallY outer portion of one of the input plates 7. A pair of friction facings 11 or linings are fixed to the opposite surfaces of the plates 10. Although not shown, the friction facings 11 are located between the pressure plate and the flywheel, and are adapted to be pressed onto the flywheel by the pressure plate so as to introduce the torque from the flywheel to the input plates 7 through the friction facings 11 and the cushioning plates 10.

The intermediate member 5 integrally has radially projected arms 15 and circumferentially long openings 16 for springs between circumferentially adjacent arms 15, respectively. Both of the input plates are provided with openings 17 faced to the openings 16, respectively. Each set of the openings 16 and 17 which are axially faced tO each other accommodate a pair of input springs 20 and 21, which are compressible coil springs and are arranged in series in the substantially circumferential direction of the disk.

The spring seat member 6 has an annular portion which is slidably fitted around arcuate outer peripheral surfaces of the arms 15. The spring seat member 6 has a plurality of spring seats 22 extending radially inwardly from said annular portion. Each spring seat 22 is located between the springs 20 and 21 of the spring pairs to engage with them. Thus, each spring seat 22 is projected into the circumferentially middle portion of each opening 16 to divide it into two portions 16a and 16b, in which the springs 20 and 21 are located, respectively.

According to the structure described above, the torque is transmitted from the input plate 7 to the intermediate plate 5 through the springs 20 or 21, the spring seats 22 and the input springs 21 or 20.

The stop pins 8 pass through recesses 25 formed at the outer periphery of the spring seat member 6. The arms 15 of the intermediate member 5 are provided at the radially outer ends with projections 26 Which project in the circumferentially opposite directions, respectively. In the illustrated neutral positiOn, the projections 26 and the base ends of the spring seats 22 are circumferentially spaced through angles of D1 and D2, which are same as circumferential angle of D1 and D2 between the stop pins 8 and the opposite edges of the recesses 25, respectively. These angles of D1 and D2 are so determined that the full compression of the input springs 20 and 21 may be prevented, and more specifically, that before the input springs 20 and 21 are fullY compressed, the input plate 7 twists through said angle of D1 or D2 relatively to the spring seat member 6, while the spring seat member 6 twists through the angle of D1 or D2 relatively to the intermediate member 5, so that the stop pins 8 contact the edges of the recesses 25 to prevent further twisting, and at the same time, the projections 26 contact the base ends of the springs ats 22 to prevent further twisting.

Figure 2:
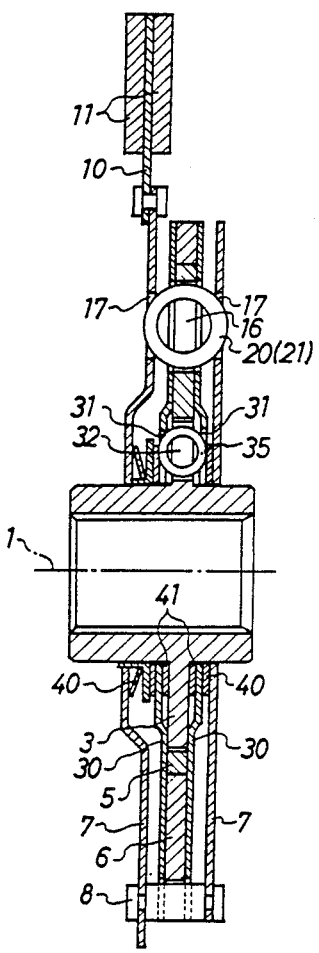
FIG. 2 is a longitudinally sectional view of the damper disk illustrated in FIG. 1.

As clearly shown in FIG. 2, annular sub-plates 30 are closely fixed by rivets to the opposite surfaces of the intermediate member 5. Both the sub-plates 30 extend radially outwardlY beyond the intermediate member 5, and at their radially outer portions, axially immovably and relatively rotatably hold the spring seat member 6. Both the sub-plates 30 extend radiallY inwardly beyond the intermediate member 5. The inner peripheral portions of the sub-plates 30 are axially faced to and slightly spaced from the flange 3. The radially inner portions of the sub-plates 30 and the flange 3 are provided with circumferentiallY spaced recesses or concavities, which form openings 31 and 32 axially facing each other. An output spring 35 is located in each set of the openings 31 and 32. The output springs 35 are formed by soft compressible coil springs of a small diameter, and are engaged at their opposite ends with the edges of the openings 31 and 32 in the illustrated neutral position, respectivelY.

The flange 3 is provided at the positions circumferentially spaced from the openings 32 with radially outward projections 36. The intermediate member 5 is provided at the inner periphery with recesses 37 in which the projections 36 are located, respectively. In the illustrated neutral position, the projections 36 and the edges of the recesses 37 are spaced from each other by angles of d1 and d2. These angles of d1 and d2 are determined so that the projections 36 may contact the edges of the recesses 37 before full compression of the output springs 35 so as to prevent further relative rotation between the intermediate member 15 and the flange 3.

As will be understood from the above description, the torque transmitted to the intermediate member 5 in the manner described before is transmitted to the flange 3 through the output springs 35. However, after the output springs 35 are compressed through a predetermined length and the projections 36 engage with the edges of the recesses 37, the torque is transmitted from the intermediate member 5 to the flange 3 through the engaged portions, i.e., the projections 36 and said edges. Said input springs 20 and 21 are harder than the output springs 35, and are disposed radially outside the input springs 35, so that the input springs 20 and 21 are not substantially or nearly compressed until the projections 36 engage with the edges of the recesses 37.

Friction members 40 are interposed between the input plates 7 and the adjacent sub-plates 30, respectively. Friction members 41 are interposed between the flange 3 and the sub-plates 30, while avoiding the output springs 35. These friction members 40 and 41 may be of conventional known structures, and may consist of, e.g., as illustrated in FIG. 2, a friction washer friction plate, conical spring and/or other member for causing the friction.

Friction is caused on the friction members 40 by the relative rotation between the input plates 7 and the intermediate member 5, and is cause on the friction members 41 by the relative rotation berween he intermediate member 5 and the flange 3. The torsion or relative rotation angle in the whole disk is a sum of the relative twist or torsion angle between the input plates 7 and the intermediate member 5 and the relative torsion angle between the intermediate member 5 and the flange 3. Therefore, as compared with the torsion angle in the whole disk, the angles through while twisting motions cause the friction on the friction members 40 and 41, respectively, are remarkably reduced, whereby the durability of the friction members 40 and 41 are improved.

The friction members 40 and 41 may be constructed to generate different frictional forces, in which case the hysteresis torque caused by them have stepped characteristics.

According to the invention, as described hereinabove, since there is provided stOp means, i.e., stop pins 8, recesses 25, projections 36 and others, so as to restrict the maximum torsion angles of the components, the maximum loads applied to the springs can be reduced, and thus the durability of the springs are improved. Further, the compressible coil output springs 35 are used as the radiallY inner springs, the relative torsion angle between the flange 3 and the intermediate member 5, which is an angle of a first step in the twisting operation, can be determined at a large value.

What is claimed is:

1. A damper disk comprising:
   an output hub;
   an annular intermediate member disposed around said output hub;
   an annular spring seat member disposed around said intermediate member, and including spring seats which project radially inwardly;
   a pair of annular input plates disposed at opposite sides of said intermediate member and around said output hub;

a plurality of circumferentially spaced pairs of input springs which circumferentially connect said input plates and said intermediate member to each other, said input springs in each pair being arranged circumferentially in series with said spring seats therebetween;

a plurality of circumferentially spaced output springs which circumferentially connect said intermediate member and said output hub to each other, said output springs being formed by compressible coil springs extending substantially in the circumferential direction of said damper disk;

a sub-plate fixed to said intermediate member for holding said output springs and a flange on said output hub and connected to said sub-plate through said output springs so that said intermediate member and said output hub are connected together through said sub-plate, said output springs and said flange in said output hub; and stop means for restricting relative rotation between said input plates and said spring seat member, between said spring seat ember and said intermediate member and between said intermediate member and said output hub.

2. A damper disc as recited in claim 1, in which said intermediate member includes a plurality of radially outward arms, said input springs being accommodated in openings formed between circumferentially adjacent said arms; and said stop means for said spring seat member and said intermediate member is formed by base ends of said spring seats and radially outer ends of said arms, which are circumferentially spaced to each other, so that said base end and said radially outer ends may contact each other during relative rotating motion before said input springs for transmitting the torque from said spring seat member to said intermediate member are fully compressed.

3. A damper disk as claimed in claim 2 wherein said stop means for said input plates and said spring seat member is formed by stop pins fixed to said input plates and edges of recesses formed in said spring seat member, through which said stop pins extend with predetermined circumferential spaces therebetween, so that said stop pins and said edges of said recesses may contact each other during relative rotating motion before said input springs for transmitting the torque from said input plates to said spring seat member is fully compressed.

4. A damper disk as claimed in claim 2 wherein said stop means for said intermediate member and said output hub is formed by edges of a recess provided at the inner periphery of said intermediate plates and a projection provided at the outer periphery of said output hub and extending radially inwardly into said recess at the inner periphery of said intermediate plate, which are circumferentially spaced from each other through predetermined spaces so that they may contact each other during relative rotation motion before said output springs are fully compressed.

5. A damper disk as claimed in claim 1 wherein said stop means for said input plates and said spring seat member is formed by stop pins fixed to said input plates and edges of recesses formed in said spring seat member, through which said stop pins extend with predetermined circumferential spaces therebetween, so that said stop pins and said edges of said recesses may contact each other during relative rotating motion before said input springs for transmitting the torque from said input plates to said spring seat member is fully compressed.

6. A damper disk as claimed in claim 1 wherein said stop means for said intermediate member and said output hub is formed bY edges of a recess provided at the inner periphery of said intermediate plates and a projection provided at the outer periphery of said output hub and extending radially inwardly into said recess at the inner periphery of said intermediate plate, which are circumferentially spaced from each other through predetermined spaces so that they may contact each other during relative rotating motion before said output springs are fully compressed.

* * * * *